US012411461B2

(12) United States Patent
Stanford et al.

(10) Patent No.: US 12,411,461 B2
(45) Date of Patent: Sep. 9, 2025

(54) PROGRAMMABLE AUTOMATION CONTROLLER BASED OPTIMIZATION

(71) Applicant: Rockwell Automation Technologies, Inc., Mayfield Heights, OH (US)

(72) Inventors: Timothy L. Stanford, Mequon, WI (US); Alexander J. Miller, Belgium, WI (US); Mayank Maheshwari, Faridabad (IN); Kevin Anthony Ellis, Bovey, MN (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 442 days.

(21) Appl. No.: 17/932,025

(22) Filed: Sep. 14, 2022

(65) Prior Publication Data

US 2024/0085861 A1    Mar. 14, 2024

(51) Int. Cl.
 *G05B 13/02*    (2006.01)
(52) U.S. Cl.
 CPC ................ *G05B 13/021* (2013.01)
(58) Field of Classification Search
 CPC ........ G05B 13/021; G05B 2219/13103; G05B 2219/13115; G05B 19/056; G05B 19/0426; G05B 2219/23146
 See application file for complete search history.

(56) References Cited

U.S. PATENT DOCUMENTS

| | | | | |
|---|---|---|---|---|
| 5,038,269 A * | 8/1991 | Grimble | ............... | G05B 13/042 |
| | | | | 700/52 |
| 2014/0282574 A1 * | 9/2014 | Marathe | ............... | G06F 9/4881 |
| | | | | 718/103 |
| 2016/0320770 A1 * | 11/2016 | Zheng | ................... | G05B 17/02 |

FOREIGN PATENT DOCUMENTS

| | | |
|---|---|---|
| CN | 109143952 A | 1/2019 |
| EP | 2913724 B1 | 10/2016 |
| GB | 2 429 539 A | 2/2007 |

OTHER PUBLICATIONS

Extended European Search Report received for European Patent Application Serial No. 23187401.7, dated Jan. 25, 2024, 11 pages.

(Continued)

*Primary Examiner* — Christopher W Carter
(74) *Attorney, Agent, or Firm* — Amin, Turocy & Watson, LLP

(57) ABSTRACT

An industrial controller can perform multi-dimensional optimization locally using the controller's native hardware and processing. An optimization algorithm is encoded on the industrial controller in a language understandable and executable by the controller (e.g., IEC61131-3). The optimization algorithm is adapted for the scan-based processing performed by industrial controllers rather than sequential processing, thereby allowing the optimization algorithm to be executed by the industrial controller as part of the controller's control program execution. A control program development system allows a user to add and configure the optimization algorithm as an instruction within the controller's control program. The instruction's configurable parameters allow the user to submit constraints and cost functions for the algorithm. During runtime, the controller executes this optimization instruction in accordance with the optimization parameters submitted by the user during development, using values of specified data tags as inputs and outputs for the algorithm.

20 Claims, 13 Drawing Sheets

(56) References Cited

OTHER PUBLICATIONS

Sehr et al., "Programmable Logic Controllers in the Context of Industry 4.0", IEEE Transactions on Industrial Informatics, vol. 17, No. 5, May 2021, pp. 3523-3533.

* cited by examiner

PROGRAMMABLE AUTOMATION CONTROLLER BASED OPTIMIZATION

TECHNICAL FIELD

The subject matter disclosed herein relates generally to industrial automation systems, and, for example, to industrial programming development platforms.

BACKGROUND ART

Many industrial control applications would benefit from mathematical optimization of control parameters. However, industrial controllers currently do not support mathematical optimization functions using their native processing resources. Consequently, if an industrial control application is to take advantage of control variable optimization, execution of the optimization routine must be offloaded to optimization tools executing on a different computing platform, such as a Windows or Linux platform. Configuring the industrial controller to exchange data with these external computing platforms would add complexity to the overall control system and increase the number of potential points of failure. This approach may also introduce security concerns, since a given optimization tool may not support the level of security that must be satisfied within the industrial environment.

The foregoing is merely intended to provide an overview of some of the problems of current technology, and are not intended to be exhaustive. Other problems with the state of the art, and corresponding benefits of some of the various non-limiting embodiments described herein, may become further apparent upon review of the following detailed description.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an industrial controller for is provided, comprising a program execution component configured to execute an industrial control program using scan-based processing, wherein the industrial control program processes input signals from industrial input devices of an automation system and controls output signals to industrial output devices of the automation system based on the input signals; and an optimization component configured to execute an optimization routine using the scan-based processing, wherein the optimization routine calculates a set of values for respective control variables that minimize an objective function subject to one or more constraints.

Also, one or more embodiments provide a method, comprising executing, by an industrial controller comprising a processor, an industrial control program using scan-based processing, wherein the executing comprises monitoring input signals from industrial input devices of an automation system and controlling output signals to industrial output devices of the automation system based on the input signals; and executing, by the industrial controller, an optimization algorithm using the scan-based processing, wherein the executing of the optimization algorithm comprises determining a set of values for respective control variables that minimize an objective function subject to one or more constraints.

Also, according to one or more embodiments, a non-transitory computer-readable medium is provided having stored thereon instructions that, in response to execution, cause an industrial controller comprising a processor to perform operations, the operations comprising executing an industrial control program using scan-based processing supported by the industrial controller, wherein the executing comprises monitoring input signals from industrial input devices of an automation system and controlling output signals to industrial output devices of the automation system based on the input signals; and executing an optimization routine using the scan-based processing, wherein the executing of the optimization routine comprises determining a set of values for respective control variables that minimize an objective function subject to one or more constraints.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
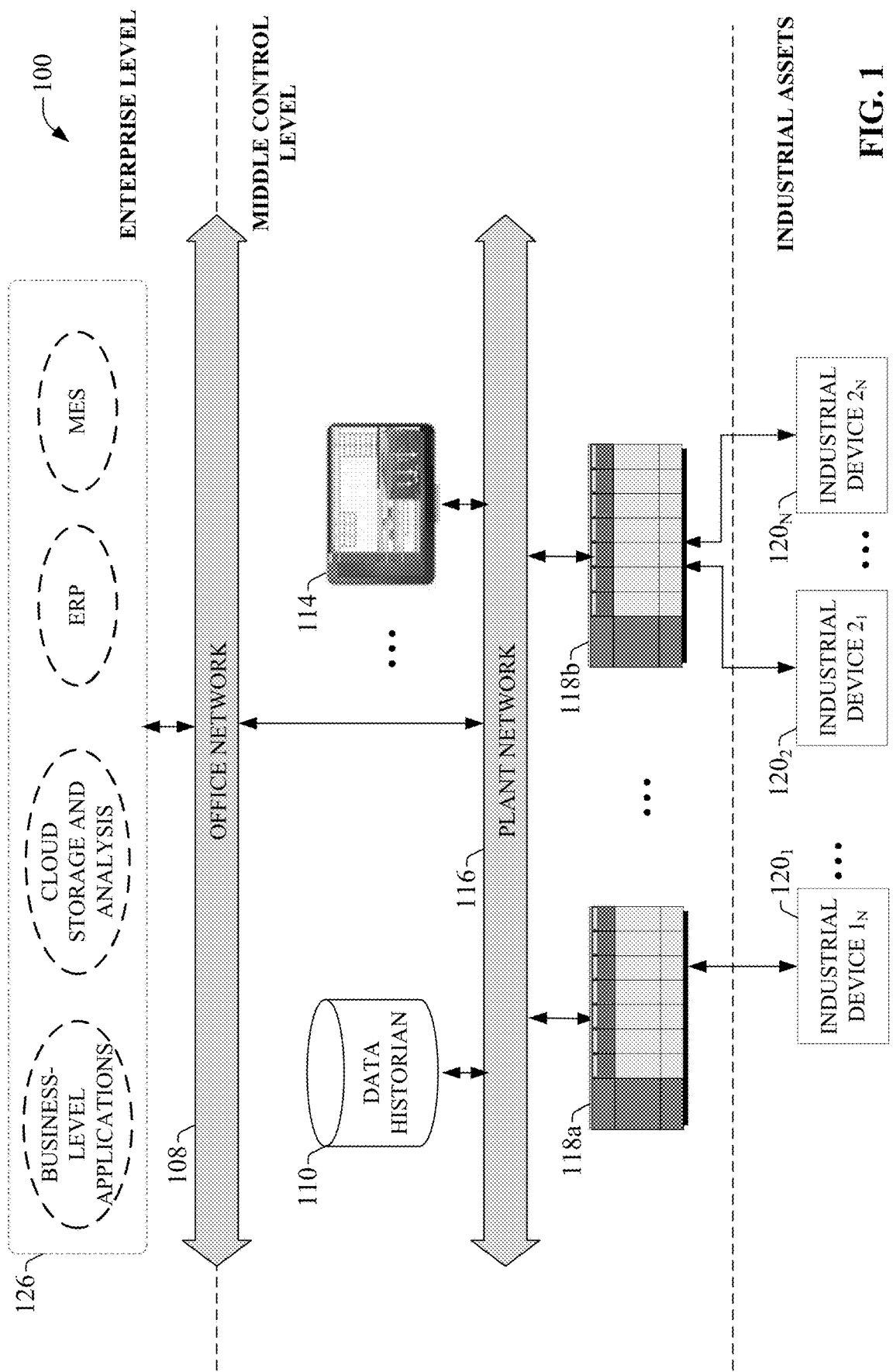
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118—e.g., programmable automation controllers (PACs) or programmable logic controllers (PLCs)—are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interface (HMI) terminals 114 that allow plant personnel to view telemetry and status data associated with the automation systems, and to control some aspects of system operation. HMI terminals 114 may communicate with one or more of the industrial controllers 118 over a plant network 116, and exchange data with the industrial controllers to facilitate visualization of information relating to the controlled industrial processes on one or more pre-developed operator interface screens. HMI terminals 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMI terminals 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMI terminals 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

Many industrial control applications could benefit from execution of machine learning-based optimization routines. According to an example use case, optimization routines could be used in connection with material blending to optimize the proportion of ingredients to be mixed for a batch process in order to satisfy a set of desired design constraints (e.g., a desired chemical property, a desired size composition, percent vertical, etc.).

However, industrial controllers 118 cannot currently support local execution of optimization algorithms. Consequently, if an industrial control application is to take advantage of an optimization routine, execution of the optimization routine must be offloaded to optimization tools executing on another computing platform, such as a Windows or Linux platform. Configuring the industrial controller 118 to exchange data with these external computing platforms would add complexity to the overall control system and increase the number of potential points of failure. This approach may also introduce security concerns, since a given optimization tool may not support the level of security that must be satisfied within the industrial environment.

To address these and other issues, one or more embodiments described herein provide an industrial controller capable of performing multi-dimensional optimization locally using the controller's native hardware and processing. An industrial control program development system for configuring the industrial controller to execute optimization algorithms is also provided. According to one or more embodiments, an optimization algorithm is encoded in a language understandable and executable by the industrial controller (e.g., an IEC61131-3 language). The optimization algorithm is adapted for the scan-based processing performed by industrial controllers rather than sequential processing, allowing the optimization algorithm to be executed by the industrial controller as part of the controller's control program execution without detriment to the controller's primary function of controlling industrial devices 120. The development system allows a user to add and configure the optimization algorithm as an instruction within the controller's control program. The instruction's configurable parameters include objective functions and constraints for the algorithm, which can be selected or defined for the optimization algorithm during development of the control program. During runtime, the controller executes this optimization instruction in accordance with the optimization parameters submitted by the user during development, using values of specified data tags as inputs and outputs for the algorithm.

Figure 2:
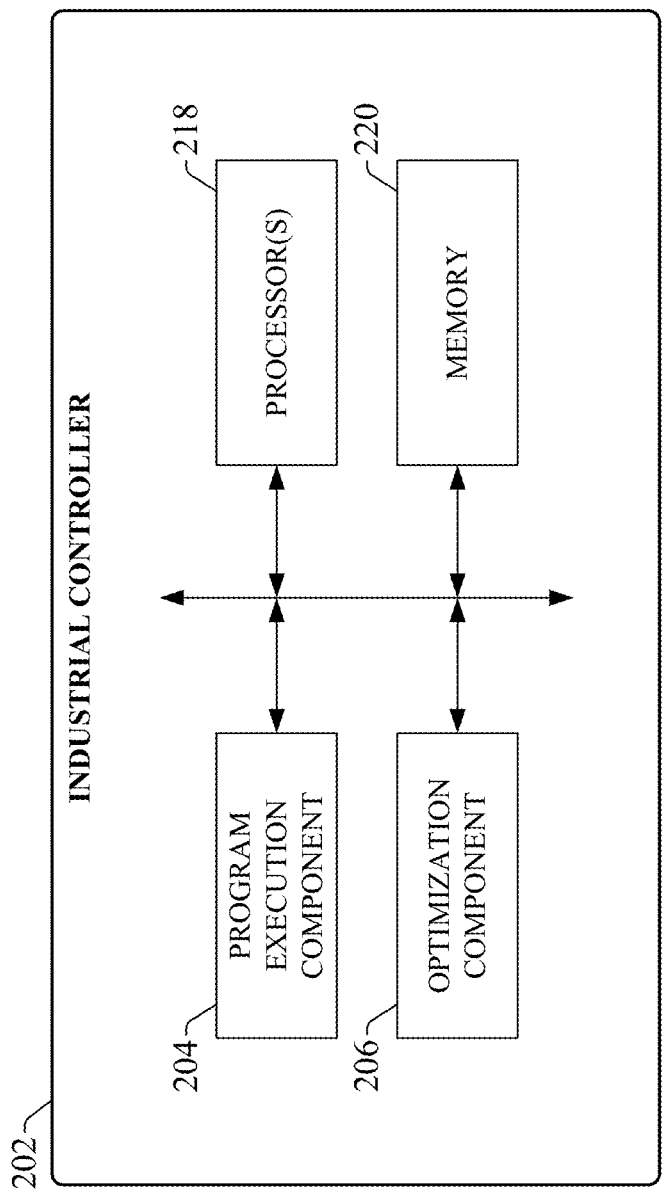
FIG. 2 is a block diagram of an example industrial controller.

FIG. 2 is a block diagram of an example industrial controller 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial controller 202 can include a program execution component 204, an optimization component 206, one or more processors 218, and memory 220. In various embodiments, one or more of the program execution component 204, the optimization component 206, the one or more processors 218, and memory 220 can be electrically and/or communicatively coupled to one another to perform one or more of the functions of the industrial controller 202. In some embodiments, components 204 and 206 can comprise software instructions stored on memory 220 and executed by processor(s) 218. Industrial controller 202 may also interact with other hardware and/or software components not depicted in FIG. 2. For example, processor(s) 218 may interact with one or more external user interface devices, such as a keyboard, a mouse, a display monitor, a touchscreen, or other such interface devices.

Program execution component 204 can be configured to execute a user-defined industrial control program designed to monitor and control an industrial system, machine, or process via the industrial controller's I/O (e.g., I/O modules or native hardwired inputs and outputs). Optimization component 206 can be configured to execute an optimization algorithm, such as a quadratic optimization algorithm, in accordance with objective functions and constraints defined in an optimization instruction included in the industrial control program. The optimization component 208 can execute the algorithm using the scanned processing supported by the industrial controller 202 rather than sequential processing typically used by optimization tools.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
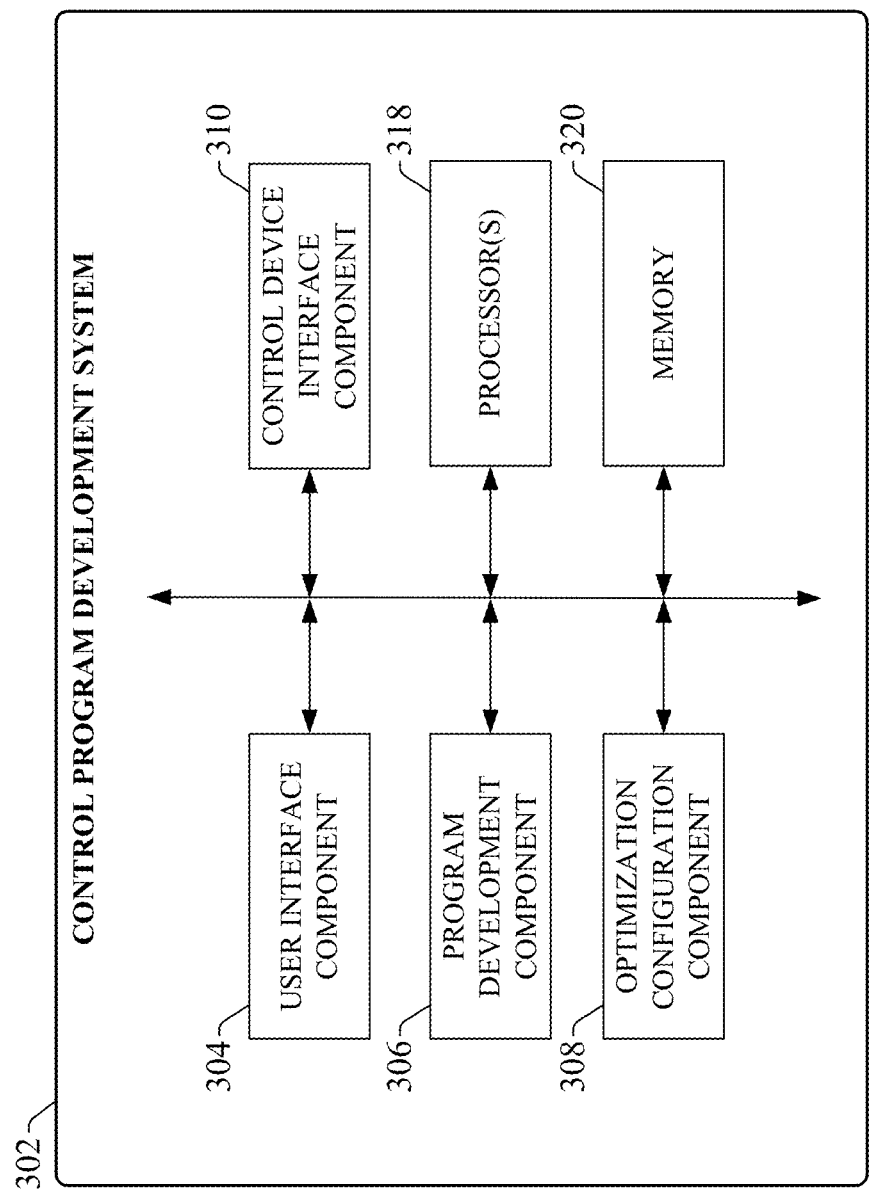
FIG. 3 is a block diagram of an example control program development system.

FIG. 3 is a block diagram of an example control program development system 302 that can be used to configure an industrial controller 202 to execute optimization algorithms according to one or more embodiments of this disclosure. Control program development system 302 can include a user interface component 304, a program development component 306, an optimization configuration component 308, a control device interface component 310, one or more processors 318, and memory 320. In various embodiments, one or more of user interface component 304, program development component 306, optimization configuration component 308, a control device interface component 310, the one or more processors 318, and memory 320 can be electrically and/or communicatively coupled to one another to perform one or more of the functions of the control program development system 302. In some embodiments, components 304, 306, 308, and 310 can comprise software instructions stored on memory 320 and executed by processor(s) 318. Control program development system 302 may also interact with other hardware and/or software components not depicted in FIG. 3. For example, processor(s) 318 may interact with one or more external user interface devices, such as a keyboard, a mouse, a display monitor, a touchscreen, or other such interface devices.

User interface component 304 can be configured to render, on a client device, development interface displays that can be used to develop industrial control programs for execution on an industrial controller 202. These interface displays can include workspaces for developing a control program via addition and configuration of program elements (e.g., ladder logic rungs, instruction blocks, etc.) as well as interactive development tools that can be accessed in connection with developing the program, including instruction libraries. Program development component 306 can be configured to generate the control program based on programming input submitted via the user interface component 304. Example control programming formats that can be supported by the system 302 include, but are not limited to, ladder logic, sequential function charts, structured text, or other such formats.

Optimization configuration component 308 can be configured to define an optimization algorithm in accordance with an objective function (such as a cost function) and constraint information submitted to the development system 302 by a user. The objective function and constraint information can be submitted as part of the development of the control program by adding an optimization instruction to the control program and defining the objective function and constraints as parameters of the instruction. The program development component 306 then adds the resulting optimization problem definition to the control program for execution during runtime.

Control device interface component 310 can be configured to establish communication with an industrial controller 202 so that controller configuration data, including the control program and associated controller configuration information (e.g., tag definitions, alarm definitions, I/O module configuration data), can be downloaded to the controller 202. The communication link established by the control device interface component 310 can also allow the user to monitor runtime data generated by the industrial controller 202 within the program development environment.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
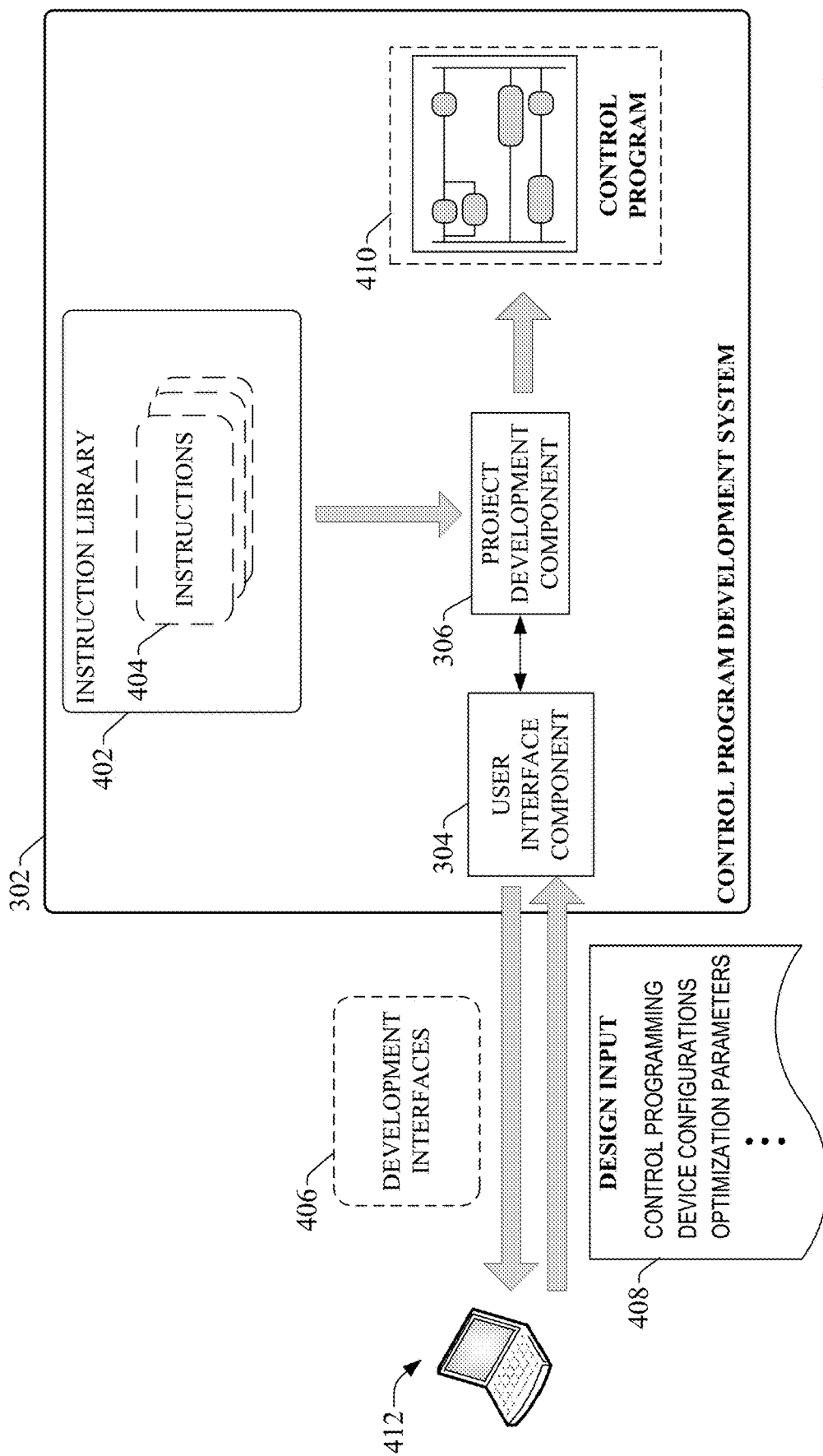
FIG. 4 is a diagram illustrating example data flows associated with creation of an industrial control program for execution on an industrial controller using the control program development system.

FIG. 4 is a diagram illustrating example data flows associated with creation of an industrial control program 410 using control program development system 302 according to one or more embodiments. A client device 412 (e.g., a laptop computer, tablet computer, desktop computer, mobile device, wearable AR/VR appliance, etc.) can access the development system's development tools and leverage these tools to create an industrial control program 410 for an automation system being developed. To this end, the development system's user interface component 304 can render suitable development interfaces 406 on the client devices 412. Through interaction with these development interfaces 406 and their associated tools, developers can submit design input 408 to the development system 302 in various supported formats, including industry-specific control programming (e.g., ladder logic, structured text, sequential function charts, etc.) and device configuration information (e.g., I/O module configuration information that defines and configures the I/O modules installed on the controller 202). In some scenarios, development system 302 may be installed locally on the client device 412. Alternatively, the development system 302 may reside and execute on a central server or cloud platform as a set of development services, which can be remotely accessed by the client device 412.

To assist in development of control programs 410, control program development system 302 can include a library 402 of instructions 404 that can be selectively added to the control program 410. Example instructions 404 available for inclusion in the control program 410 can include, but are not limited to, output instructions, data shift instructions, mathematical instructions (e.g., add, subtract, multiply, etc.), or other such instructions. A given instruction 404 defines the type of function performed by the instruction 404 as well as user-configurable arguments or parameters for the function. In the case of ladder logic programming, the developer can add a selected instruction 404 to the control program 410 as an output to a selected rung of the control program 410, such that the function represented by the instruction 404 is executed when the rung transitions to the TRUE state (that is, all programmatic conditions defined for the rung are satisfied).

Figure 5:
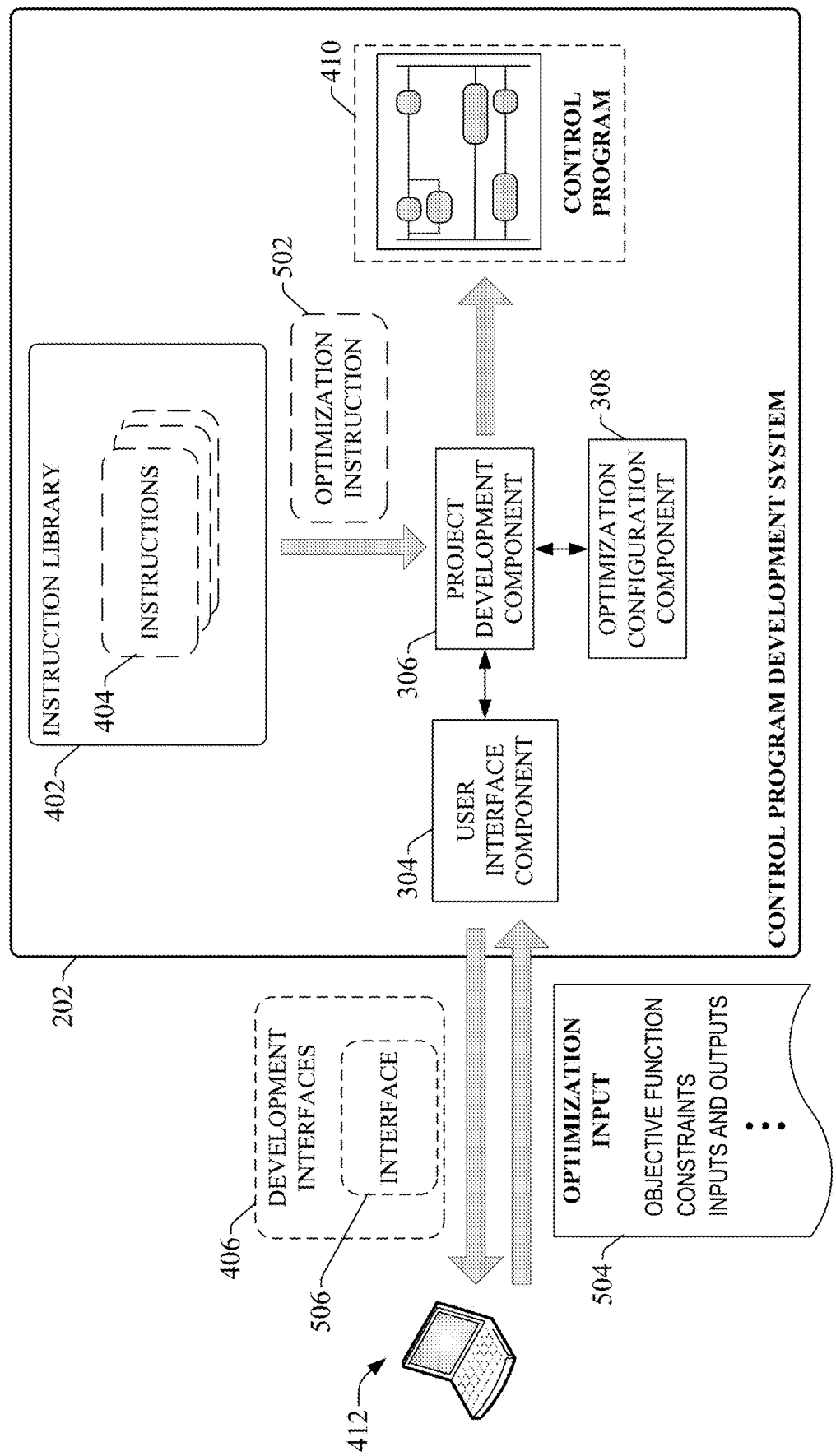
FIG. 5 is a diagram illustrating addition and configuration of an optimization instruction to a control program being developed.

The set of instructions 404 available in the instruction library 402 includes an optimization instruction, which can be added to the control program 410 and configured by the user to execute, on the industrial controller 202, an optimization routine using machine learning. FIG. 5 is a diagram illustrating addition and configuration of an optimization instruction 502 to a control program 410 being developed. The development interfaces 406 rendered by the user interface components 304 can allow the user to add the optimization instruction 502 to the control program 410 using a similar workflow to that used to add other types of instructions 404; e.g., by selecting the optimization instruction 502 from the library 402 and adding an instance of the optimization instruction 502 to a selected rung of the control program 410 (in the case of ladder logic programming). The developer can then interact with the optimization instruction 502 by invoking an interface 506 associated with the instruction 502. The interface 506 can be invoked, for example, by double-clicking on the instruction 502.

The interface 506 can render configurable data fields corresponding to parameters of the optimization problem to be solved by the optimization instruction 502. These data fields allow the user to specify an objective function to be solved or minimized (e.g., a cost function) and to define constraints on the function's variables. Values of these optimization parameters can be submitted as optimization input 504 via interaction with the optimization instruction's interface 506.

In some embodiments, the interface 506 can allow the user to select a type of objective function to be minimized by the optimization instruction 502 from a set of predefined objective function forms (e.g., nonlinear functions such as quadratic functions, or linear functions). The user can link some or all of the objective function's variables to selected data tags defined for the industrial controller 202 as part of the control program 410. This can include selecting data tags to act as variables for the objective function. The data tags selected will typically depend on the nature of the control problem being optimized. For example, in an example scenario in which the optimization algorithm is to determine a blending of materials for a batch sequence that will satisfy multiple specified constraints (e.g., a constraint on a percentage of a given material, a desired size composition, a percent vertical, etc.), the variables of the objective function to be optimized may be set to be setpoint values for the respective materials. The resulting optimized setpoint values will then be used by the industrial control program 410 to control the amounts of each material added during material blending batch process.

Figure 6:
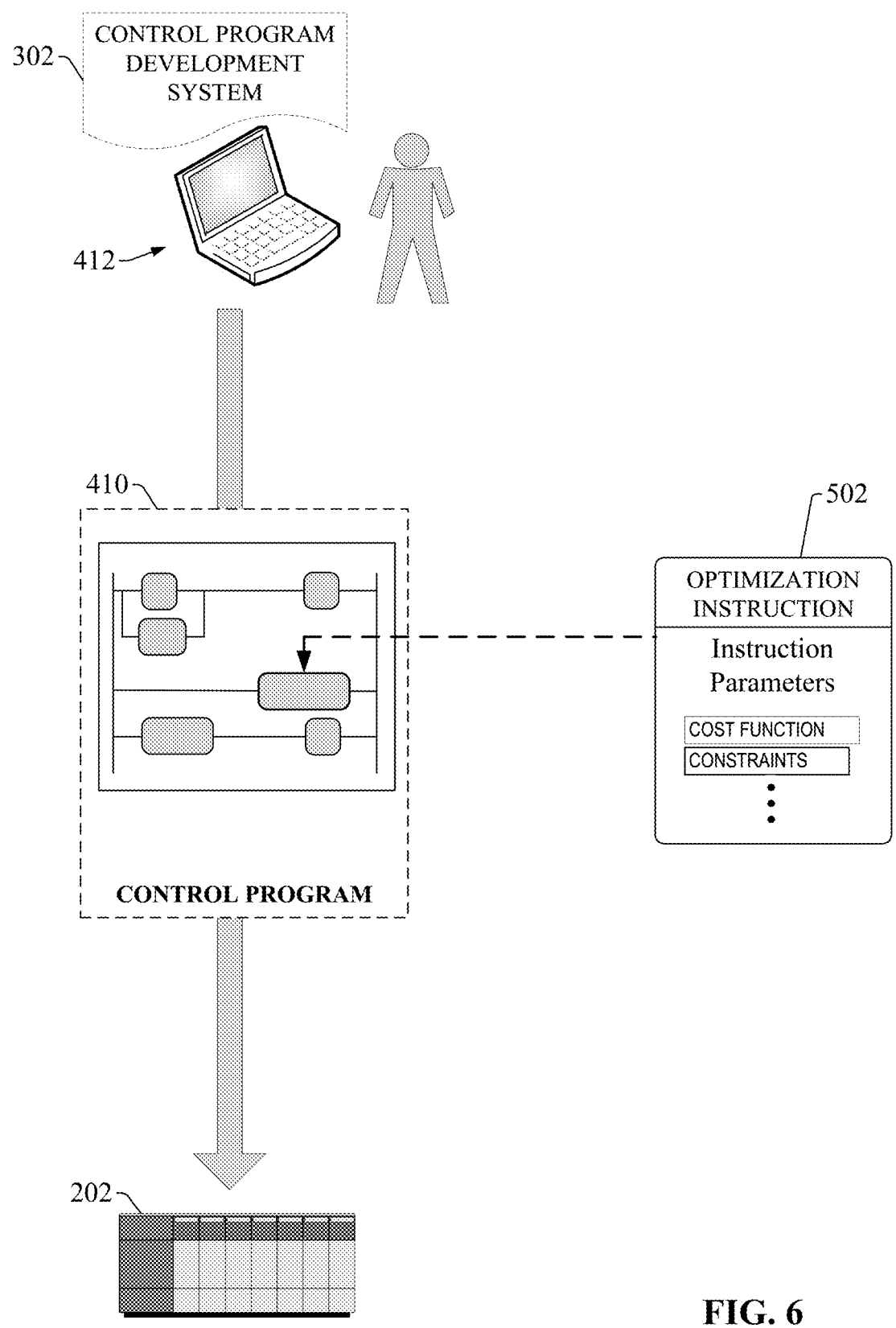
FIG. 6 is a diagram illustrating configuration of an optimization-enabled industrial controller.

The optimization configuration component 308 can define the optimization problem to be solved by the controller 202 based on the optimization instruction 502 and the associated optimization input 504 submitted by the user. When development of the control program 410 is complete, the resulting program file can be installed on the industrial controller 202 for execution. FIG. 6 is a diagram illustrating configuration of an optimization-enabled industrial controller 202, which may be a hardware controller, a soft controller, a cloud-based controller or other type of industrial controller. Industrial controller 202 can be configured using the control program development system 302 by communicatively interfacing the development system 302 to the controller 202 (e.g., using the control device interface component 310) and downloading the completed control program 410 to the controller 202 for execution. The control program 410 can be installed on the controller 202 as a configuration file that also includes configuration data that configures other features of the controller 202, including but not limited to the controller's I/O modules and individual I/O parameters, networking parameters, and other such configurable features.

As described above, the control program 410 can include one or more optimization instructions 502 that define an optimization problem to be solved by the controller 202 during runtime. The nature of the optimization problem to be solved by the instruction 502 is defined by the user-configurable instruction parameters configured for the instruction 502. These instruction parameters include a selected type of objective function to be minimized or maximized by the instruction 502 (e.g., a selected type cost function, such as a quadratic function or another type of non-linear or linear function), definitions of constraints on the objective function, mappings of the function's parameter or variables to selected data tags defined on the controller (e.g., control setpoints, telemetry values read from analog or digital sensors, values of output data tags to be translated to control output signals, etc.) or other such parameters. In the case of ladder logic programming, the optimization instruction 502 can be integrated into the control program 410 as an output instruction assigned to a selected rung of the program 410, such that the instruction 502 and its associated optimization algorithm is executed when the rung transitions to its TRUE state. In general, optimization instruction 502, when executed by the controller's program execution component 204, can execute, locally on the industrial controller 202, the optimization algorithm defined by the instruction 502 and its user-defined parameters to derive a solution for the specified objective function given the defined constraints. This can involve finding values of a set of data tags that minimize or maximize the objective function while simultaneously satisfying all defined constraints on the objective function.

Figure 7:
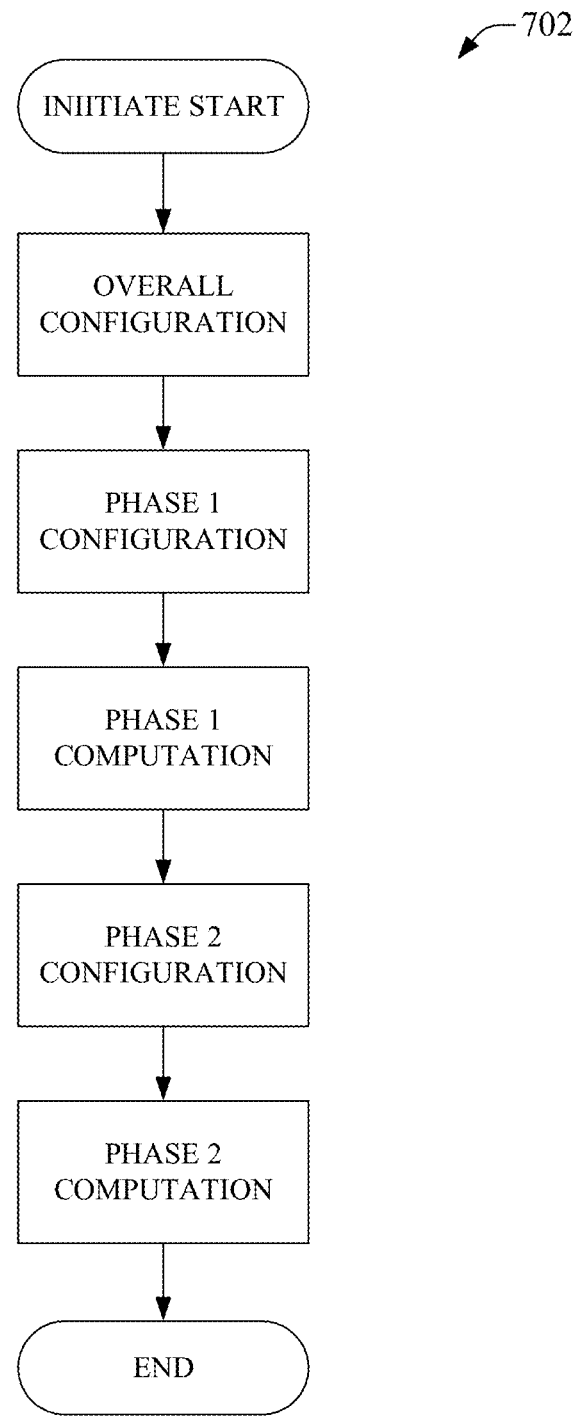
FIG. 7 is a flowchart of an example, high-level execution sequence for an optimization algorithm that is executed using sequential processing.

Given the types of computational platforms on which optimization tools are typically executed (e.g., Windows or Linux machines), these tools typically execute their optimization algorithms using sequential, or linear, processing. FIG. 7 is a flowchart 702 of an example, high-level execution sequence for an optimization algorithm that is executed using sequential processing. As illustrated in this flowchart, the general steps of the optimization sequence—overall configuration, phase 1 configuration, phase 1 computation, phase 2 configuration, phase 2 computation, etc.—are executed strictly sequentially, such that a subsequent step is not executed or evaluated until its preceding step is complete. This sequential execution approach is consistent with the sequential processing supported by the computational platforms on which these optimization tools are typically executed.

The processing architecture of an industrial controller 202 is fundamentally different from that of other computational platforms, such as Windows or Linux machines. In contrast to the sequential processing performed by those platforms, industrial controllers execute their control programs using a scan-based processing approach. According to this type of processing, the lines of programming defined by the control program 410—e.g., rungs of ladder logic code in the case of ladder logic programming—are scanned from top to bottom for each of a continuous series of scan cycles. At the beginning of a given scan cycle, the values of the data tags defined in the controller's data table are updated to reflect new input values read from input devices that monitor aspects of the controlled industrial system or process (e.g., telemetry devices, sensors, remote I/O, etc.). The lines of programming are then evaluated, one line at a time, from top to bottom based on the updated data tag values. Rungs that evaluate as true—that is, rungs whose logical input conditions are satisfied—execute their output instructions, or turn on their output coils, prior to evaluation of the next rung, while rungs that evaluate as false do not execute their output instructions or turn on their output coils. When all lines of programming have been evaluated for the current scan cycle, the data tag values are again updated and the next scan cycle begins.

Figure 8:
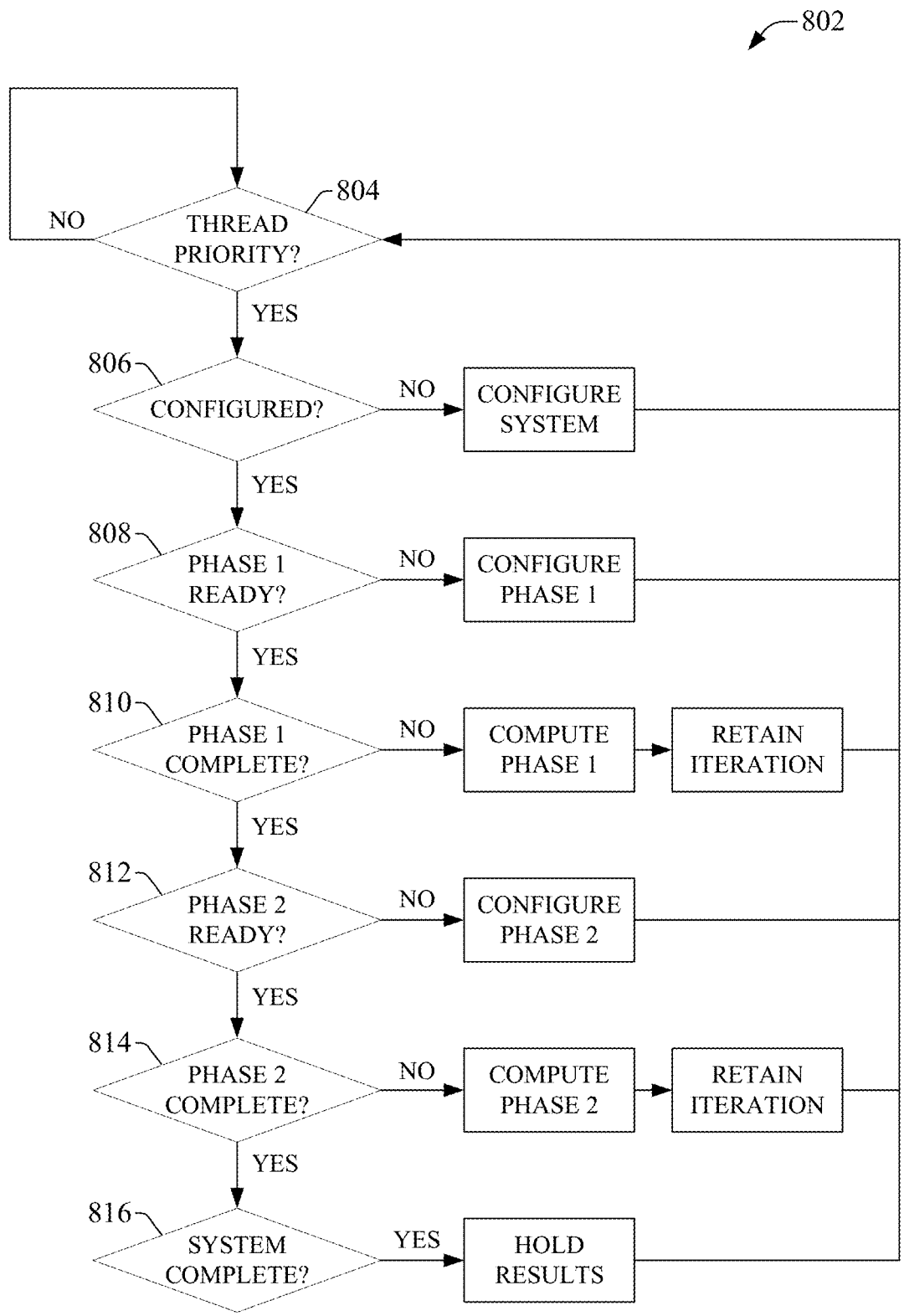
FIG. 8 is a flowchart of an example, high-level execution sequence for the optimization algorithm using scanning processing.

To adapt the execution of optimization algorithms for the scan-based processing performed by the industrial controller 202, the optimization algorithm executed by the optimization instruction 502 is encoded for the industrial controller's scanning processor using a language that complies with industrial control programming standards, such as an IEC61131-3 standard. FIG. 8 is a flowchart 802 of an example, high-level execution sequence for the optimization algorithm using scanning processing. When the optimization instruction 502 is initiated during a scan cycle (that is, while the rung on which the optimization instruction 502 is in its TRUE state), the controller's program execution component 204 does not wait for the optimization algorithm to complete full execution before evaluating the next rung of the program 410. Rather, upon completion of a step or iteration of the optimization routine, the program execution component 204 reevaluates whether the optimization routine has priority to execute its next step or iteration. To ensure that other higher priority control or safety functions are executed by the control program 410 in a timely manner without being delayed by the optimization processing, the program execution component 204 allows for controlled exit from and reentry into the optimization computation, based on priority, rather than performing the full optimization computation as a linear beginning-to-end computation.

When the optimization instruction 510 is initiated by a true condition on its corresponding rung, the program execution component 204 first determines whether the optimization algorithm has execution priority (step 804) for the present scan cycle. Any suitable criterion can be used by the program execution component 204 to determine whether the optimization computation is to be granted priority for the present scan cycle. Priority for the optimization algorithm may be determined based in part on current control operations being performed by the industrial controller 202 (e.g., a current operating mode, a current phase of a control process, etc.), such that priority is not granted to the optimization algorithm if a high-priority control operation or safety function is currently being performed. This ensures that crucial control or safety operations carried out by the industrial controller 202 are not delayed due to consumption of processing resources by the optimization computation. If the optimization algorithm is granted priority (YES at step 804), a determination is made as to whether overall configuration of the optimization system is complete (step 806). This may include, for example, initializing variables or establishing other initial conditions for the optimization problem. If the overall configuration is not complete, the system configuration step is executed as part of the present scan cycle, and the processing scan continues with the next rung of the program 410.

When the next scan cycle returns to the rung in which the optimization instruction 510 resides, it is again determined whether the optimization computation has priority at decision step 804. This offers the controller 202 the opportunity to exit the optimization computation if a high-priority control or safety task has been initiated since the previous scan cycle. On the next scan cycle in which the optimization computation has priority (YES at step 804)—which may be the immediately subsequent scan cycle or another subsequent scan cycle in which no high-priority control or safety operations are being performed—decision block 806 is evaluated immediately as true since the overall optimization system has already been configured (YES at step 806). Accordingly, for the present scan cycle the controller 202 determines whether phase 1 (e.g., a first iteration of the optimization algorithm) is ready and, if not, configures phase 1 during the present scan cycle. The processing scan then continues with the next rung of the program 410. For the next scan cycle, since phase 1 is ready, and assuming the optimization processing still has priority, the first three decision steps 804, 806, and 808 are evaluated as true, and a determination is made at step 810 as to whether phase 1 of the optimization routine is complete. If not, phase 1 of the optimization routine is performed and the results retained. The results may be, for example, a current set of non-finalized values for the control variables being optimized.

This process proceeds through each phase or iteration of the optimization routine across multiple processing scans of the controllers' program execution component 204. Although only two phases of the optimization routine are depicted in FIG. 8 for brevity, execution of the optimization routine may comprise any number of iterative phases. In general, determining an optimal or presumed optimal solution to the optimization problem defined by the optimization instruction 510 may be an iterative computational process whereby different sets of values (e.g., control setpoints or other control parameters) are evaluated against the selected objective function (such as a cost function) and associated constraints in order to find a set of values that satisfy a minimization (or maximization) criterion for the objective function. This iterative process may comprise any number of iterative phases, which are executed over multiple scan cycles of the industrial controller 202 using the general execution flow illustrated in FIG. 8, with results of the previous iteration held in memory for use by the next iteration. Depending on whether any high-priority control tasks are undertaken by the controller during execution of the optimization algorithm, the optimization processing may be completed over multiple consecutive scan cycles, or over multiple non-contiguous scan cycles as a result of the controller 202 selectively exiting and re-entering the optimization process to accommodate higher priority control or safety tasks. The optimization computation is considered complete (YES at step 816), when a current set of control values calculated by the optimization algorithm cause the objective function to satisfy a minimization (or maximization) criterion while also satisfying all defined constraints on the objective function.

At any time during execution of the optimization algorithm illustrated in FIG. 8, the program execution component 204 may exit the optimization routine if the controller 202 begins executing a higher priority control or safety operation that should not be compromised or delayed due to the processing time required to execute the optimization routine. In such scenarios, the optimization algorithm will hold its current state (retain iteration) so that the optimization processing will continue from its most recent state once the optimization algorithm is again granted thread priority.

Figure 9:
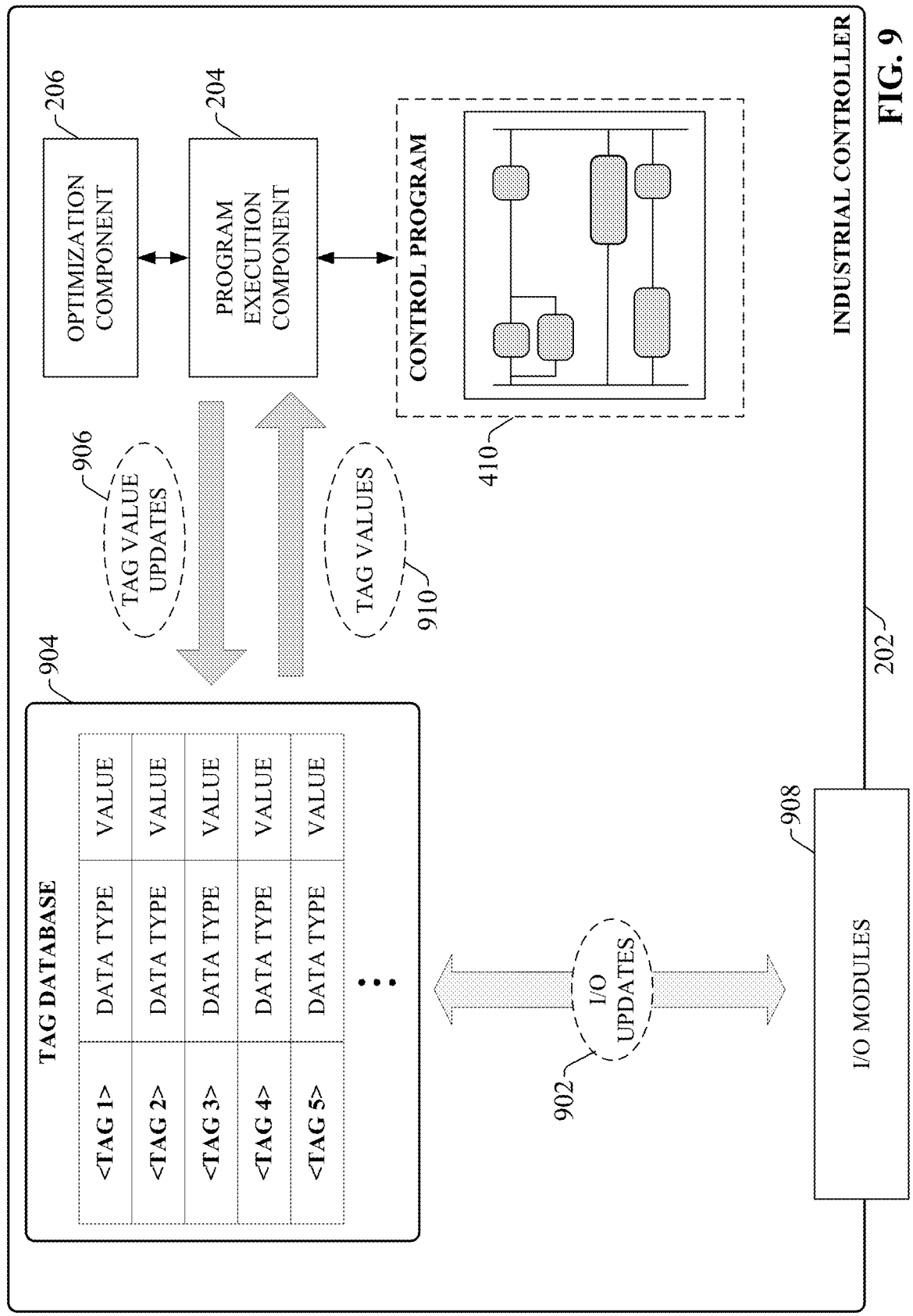
FIG. 9 is a diagram illustrating execution of a control program on an industrial controller during runtime.

FIG. 9 is a diagram illustrating execution of the control program 410 on industrial controller 202 during runtime. The controller 202 stores and maintains a tag database 904, which defines controller tags that store data values in connection with execution of control program 410, as well as internal data tags whose values are updated by the control device's internal diagnostics. Each entry of the tag database 904 corresponds to a controller tag. For each controller tag, the tag database 904 defines metadata about the tag, such as the tag's data type (e.g., binary, real, integer, string, a user-defined data type, etc.), as well as the current value of the data tag. The values of some controller tags are updated based on tag value updates 906 generated by the control program 410 (e.g., when a bit is set or reset by the program 410, or if an analog or string value is modified by the program 410). Some controller tags represent values of digital or analog input signals received from input devices—e.g., telemetry devices, sensors, etc.—connected to the controller's I/O modules 908. Values of these input data tags are updated based on I/O updates 902 from the controller's I/O modules 908 or other types of I/O associated with the controller 202, such as remote or networked I/O. Control program 410 also reads controller tag values 910 from the tag database 904 at the beginning of each scan cycle, or during a scan cycle, so that tag values that serve as control program variables are kept up-to-date during program execution. Values of controller tags corresponding to digital or analog outputs are used to control output signals of corresponding outputs of I/O modules 908.

Figure 10:
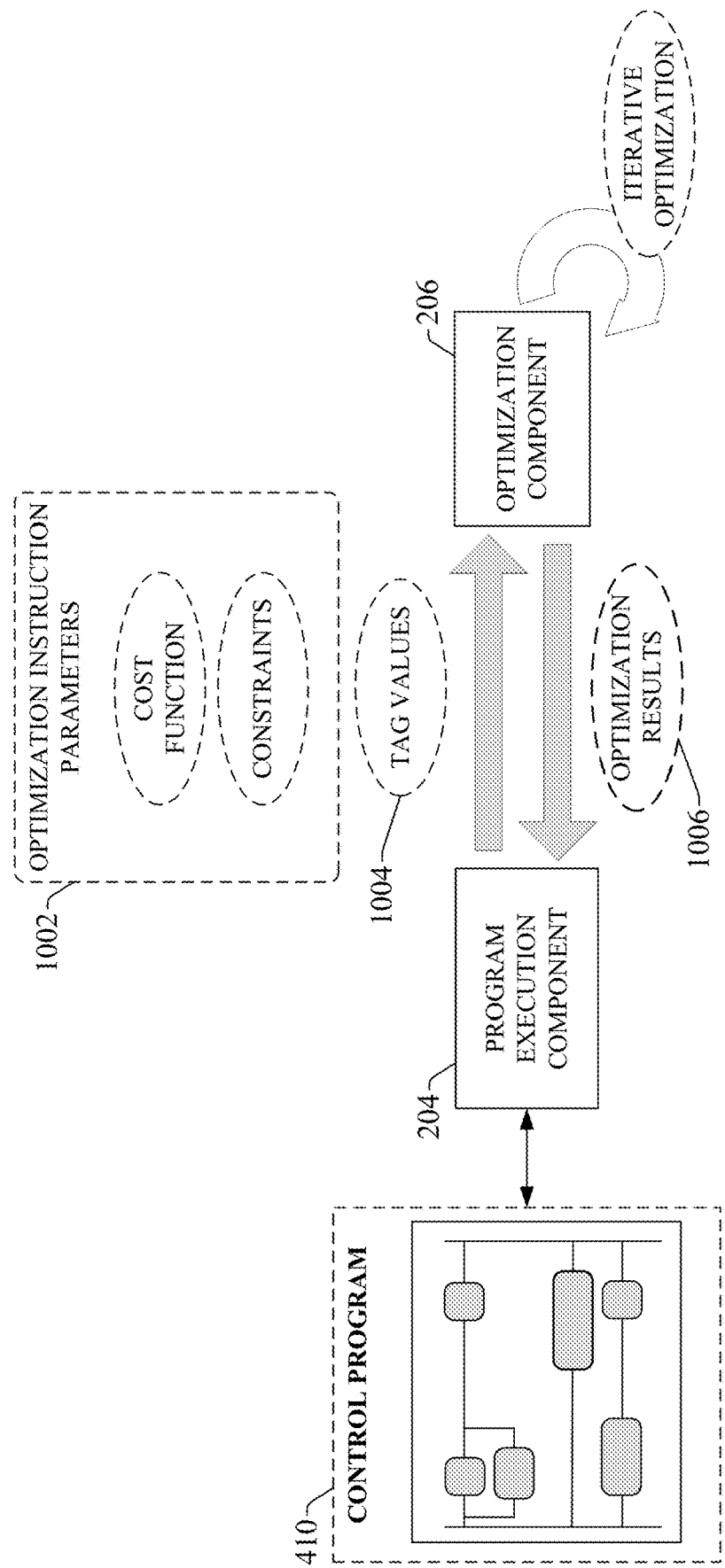
FIG. 10 is a diagram illustrating execution of an optimization computation by a program execution component and an optimization component.

When the optimization instruction 510 is initiated during runtime (e.g., when a rung to which the optimization instruction 510 is assigned transitions to its TRUE state), the program execution component 204 and the optimization component 206 carry out the scan-based optimization computation in accordance with the loop-controlled, priority-based execution approach illustrated in FIG. 8. FIG. 10 is a diagram illustrating execution of the optimization computation by the program execution component 204 and the optimization component 206. As described above in connection with FIG. 8, execution of the various steps, phases, or iterations of the optimization calculation is performed across multiple continuous or non-continuous scan cycles of the industrial controller 202, with the program execution component 204 exiting and re-entering the overall computation sequence in a controlled manner based on a current priority of the optimization calculation relative to other control functions being performed by the industrial controller 202.

The optimization instruction parameters 1002 defined for the optimization instruction 510—e.g., the specified objective function and its associated constraints—define the optimization problem to be minimized or maximized. These parameters 1002 are passed to the optimization component 206. If appropriate, the values 1004 of any data tags that are relevant to the optimization problem to be solved are also passed to the optimization component 206. Data tag values 1004 may be required for the optimization computation, for example, in scenarios in which one or more of the constraints are defined as a function of current values of one or more data tags (e.g., current sensor readings, current operator-defined setpoints, etc.).

Optimization component 206 generates the optimization algorithm to be solved based on the optimization parameters 1002 using a programming language supported by the industrial controller, such as an IEC 61131-3 language. For embodiments in which industrial controller 202 does not support significant math functions that are typically used to solve optimization problems, such as matrix math, the optimization component 206 can implement the optimization coding using basic arithmetic functions with control looping as needed.

Optimization component 206 uses the local processing and memory resources of the industrial controller 202 to determine a solution for the optimization problem that satisfies a defined minimization or maximization criterion defined by the constrained objective function or cost function. This may involve performing multiple iterations of the optimization algorithm using varying value sets until a value set is found that satisfies a defined minimization or maximization criterion relative to the constrained objective function. As described above in connection with FIG. 8, this iterative optimization computation is executed using a priority-based, loop-controlled processing approach supported by the controller's scan-based processing, and using a programming language supported by the industrial controller. Once the optimization component 206 has determined a set of values (e.g., control setpoints or other value sets to be optimized) that satisfy the minimization or maximization criterion of the constrained objective function, these optimization results 1006 are returned for consumption by the control program 410. The control program 410 can use the resulting optimized values in connection with carrying out one or more related control functions.

An example type of control-related optimization problem that can be defined using the optimization instruction 510 and solved natively on the industrial controller 202 is now described. In this example, the industrial controller 202 is used to monitor and control a material blending process in which materials stored in respective different storage silos are selectively combined and mixed. Depending on the system implementation, the materials may be combined and mixed in a hopper or may be blended on a delivery conveyor that transports the blended material to a truck for loading. In general, the blending of these different materials must satisfy a set of output constraints while also operating within a set of operational constraints, including mixed equality and inequality constraints. Some of the blending objectives may be described quadratically, while other constraints may be linear.

In the present example, material from six source silos is to be blended to produce a specified product. The control variables or setpoints to be optimized are the weights $x_1$, $x_2, \ldots, x_6$ of material to be drawn from each silo. The primary goal or objective of this blending is to produce a mixed material having a specified percentage of a Material A. The percentage of Material A in each input silo can be maintained within a quality system as $Q_1^A, Q_2^A, \ldots Q_6^A$. The total percentage of Material A can then be represented as $$Q_{total}^A = \frac{Q_1^A x_1 + Q_2^A x_2 + Q_3^A x_3 + Q_4^A x_4 + Q_5^A x_5 + Q_6^A x_6}{x_1 + x_2 + x_3 + x_4 + x_5 + x_6} \quad (1)$$

In addition to the primary objective of yielding a specified percentage of Material A, there are two additional objectives regarding the relative amounts of material from each of the silos. The first is an objective regarding a specified composition of silos 1, 3, and 5 designated as S as given by $$S = 100 \frac{x_1 + x_3 + x_5}{x_1 + x_2 + x_3 + x_4 + x_5 + x_6} \quad (2)$$

and a specified composition of silos 3 and 4 designated V given by $$V = 100 \frac{x_3 + x_4}{x_1 + x_2 + x_3 + x_4} \quad (3)$$

Each of these three objectives has an associated target value $Q_T^A$, $S_T$, and $V_T$, respectively. This leads to a weighted least squared error objective function of $$f(\vec{x}) = W_1(V_T - V)^2 + W_2(S_T - S)^2 + W_3(Q_T^A - Q_{total}^A)^2 \quad (4)$$

where $\vec{x} = \{x_1, x_2, \ldots, x_6\}$.

The associated optimization problem to be solved is given by $$\vec{x}^* = \underset{\vec{x}}{\operatorname{argmin}} f(\vec{x}) \quad (5)$$

or to find a set of values $\vec{x} = \{x_1, x_2, \ldots, x_6\}$ that minimize the function given by equation (4) subject to the constraints.

Other constraints can also be placed on $\vec{x}$, including both inequality constraints and equality constraints. Example inequality constraints in this example can include, but are not limited to, a requirement that the respective weight values x must be non-negative and must be less than a specified maximum; maximum and minimum limits on the size composition S and the percentage vertical V; maximum and minimum limits on the percentage of Material A; maximum limits on three secondary chemistries $Q_{total}^B$, $Q_{total}^C$, and $Q_{total}^D$; maximum and minimum limits on the total percentage $Q_{total}^A$ of Material A; maximum and minimum limits on percentages of the total product contributed by one or more silo groupings (e.g., a group comprising $x_1$ through $x_4$, or a group comprising $x_5$ and $x_6$), or other such constraints. The sole equality constraint in this example use case is a requirement that the sum of all x values must be equal to a specified value.

In this example, quadratic programming is used to find an optimal solution. Quadratic programming uses the standard form given by:

$$f^*(\vec{x}) = \frac{1}{2} \vec{x}^T H \vec{x} + \vec{x}^T g \quad (6)$$

A matrix H and vector g can be shown to meet the quadratic form given by $$\hat{f}(\vec{x}) = \frac{1}{2} \vec{x}^T H \vec{x} + \vec{x}^T g \quad (7)$$

that satisfy $$f(\vec{x}) = \hat{f}(\vec{x}) + \tilde{V}_T^2 W_1 + S_T^2 W_2 + Q_T^{A^2} W_3 \quad (8)$$

and $$\operatorname{argmin}(f(\vec{x})) \approx \operatorname{argmin}(\hat{f}(\vec{x})) \quad (9)$$

The standard form of constraints can be given by:

$$\vec{\alpha}_i \vec{x} \leq b_i \forall i \in I \quad (10)$$

$$\vec{\alpha}_j \vec{x} \leq b_i \forall j \in \varepsilon \quad (11)$$

where I and $\varepsilon$ are the set of all inequality and equality constraint indices.

Due to physical limits, $x_i$ cannot be less than zero or greater than the amount of material in the source container. These standard constraints are in addition to constraints $y_i$ above, and are given by $$x_{imax} = \min(L_i, y_{imax}) \forall i \in \{1,2,3,4,5,6\} \quad (12)$$

$$x_{imin} = \max(0, y_{imin}) \forall i \in \{1,2,3,4,5,6\} \quad (13)$$

With all constraints in linear form, (10) and (11) can be shown in the matrix form $$A_{in} \vec{x} \leq \vec{b}_{in} \quad (14)$$

$$A_{eq} \vec{x} \leq \vec{b}_{eq} \quad (15)$$

The optimization component 206 can solve the quadratic program in two parts by first finding a feasible starting point for the values to be optimized (that is, values for iteration 0), and then computing an optimum set of values from the feasible starting points over one or more additional iterations j. With m and r representing the number of inequality constraints and equality constraints, respectively, the quadratic programming algorithm can obtain feasible initial values of $\vec{x}_0$, $J_0$, and $D_0^{-1}$, where $J_j = \{\alpha_{1j}, \ldots, \alpha_{nj}\}$: ordered index set for iteration j,
$1 \leq \alpha_{ij} \leq m$: active inequality constraint,
$m+1 \leq \alpha_{ij} \leq m+r$: equality constraint,
$\alpha_{ij} = 0$: free column,
$\alpha_{ij} = -1$: conjugate direction column
$D_0^T = [d_1, \ldots d_n]$,
$D_i = a_{\alpha i0}$, and
$D_j^{-1} = [c_{1j}, \ldots c_{nj}]$ Using the definitions above, the original quadratic programming problem can be restated to minimize equation (6) above subject to inequality constraints $$\vec{a}_i\vec{x} \leq b_i \forall i \in \{1,\ldots,m\} \qquad (16)$$

and equality constraints $$\vec{a}_j\vec{x} = b_j \forall j \in \{m+1,\ldots,m+r\} \qquad (17)$$

A feasible state can be determined by solving a second optimizing problem known as an initial point problem. According to this approach, the function $$(-\Sigma_{i=m+1}^{m+r}\alpha_i)^T\vec{x}+p \qquad (18)$$

is minimized subject to $$\alpha_i^T\vec{x} - p \leq b_i \forall i \in \{1,\ldots,m\}, \qquad (19)$$

$$\alpha_i^T\vec{x} \leq b_i \forall i \in \{m+1,\ldots,m+r\}, \qquad (20)$$

and $$-p \leq 0 \qquad (21)$$

If it is ensured that $b_{m+1}$ through $b_{m+r}$ are non-negative, the initial conditions for the initial point problem can be given by $$\vec{x}_0 = \{0\}_n \qquad (22)$$

$$p_0 = \max(1, -b_1, \ldots, -b_m) \qquad (23)$$

$$J_0 = \{0\}_{n+1} \qquad (24)$$

and $$D_0^{-1} = I_{n+1} \qquad (45)$$

Solving this initial point problem provides the initial values $\vec{x}_0$, $J_0$, and $D_0^{-1}$ to begin the quadratic programming. Accordingly, the optimization component 206 can solve this initial point problem locally on the industrial controller 202 using controller-based programming language (e.g., a IEC61131-3 language) and the scanning-based processing described above in connection with FIG. 8. With the initial values obtained, the optimization component 206 can execute subsequent iterations of the quadratic algorithm to find a set of values $x_1, x_2, \ldots, x_6$—representing respective weights of material from respective material silos to be blended—that minimize equation (6) (or that satisfy a minimization criterion that signals an end to the iterative processing) subject to the inequality and equality constraints (36) and (37). The resulting optimized values can be output to the appropriate data tags defined in the controller 202 that correspond to the weights of material to be drawn from the respective silos and blended for the current batch. The data tags to which the optimized values are to be written can be defined by the user as instruction parameters of the optimization instruction 502 (together with the type of objective or cost function to be solved and the relevant constraints).

The foregoing example material blending use case is only intended to be exemplary, and it is to be appreciated that the controller-based optimization processing described herein can be used to obtain substantially optimized values of control parameters for any type of industrial control application or function by minimizing a cost function subject to user-defined equality or inequality constraints. The controller 202 can use substantially any type of minimization approach in connection with obtaining optimized values of control parameters, including but not limited to machine learning regression algorithms.

Performing optimization tasks directly on an industrial controller 202, rather than interfacing the controller to a separate external optimization tool, can simplify the overall system by eliminating the need to maintain additional computing platforms and the data communication channels between those platforms and the industrial controller. Performing these optimization tasks using the controller's local resources can also yield optimized control parameters in less time relative to outsourcing the optimization calculation to an external optimization tool. The optimization component 206 executes the optimization processing in a priority-based manner such that steps of the optimization computation are performed only when critical tasks are not currently being performed by the controller 202, ensuring that optimization processing does not compromise the performance and safety of the overall control process carried out by the controller 202.

Figure 11:
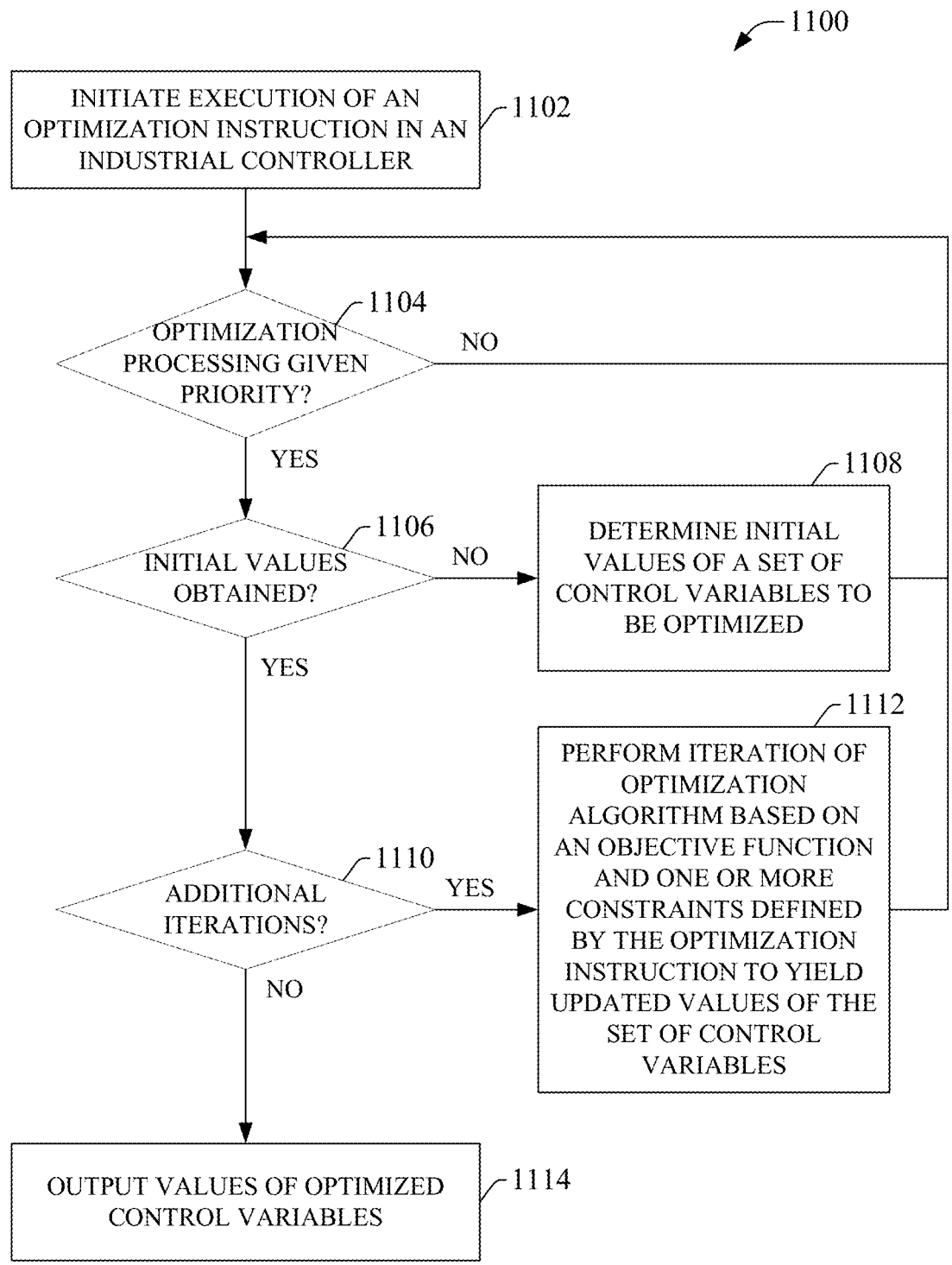
FIG. 11 is a flowchart of an example methodology for executing an optimization algorithm on an industrial controller to obtain substantially optimized values for a set of control parameters.

FIG. 11 illustrates a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 11 illustrates an example methodology 1100 for executing an optimization algorithm on an industrial controller to obtain substantially optimized values for a set of control parameters. Initially, at 1102, execution of an optimization instruction defined on an industrial controller, such as a PLC or a PAC, is initiated. The optimization instruction can be defined as an output instruction assigned to a line or rung of the industrial control program executing on the industrial controller, and can be initiated when the line or rung of the control program goes true during runtime (e.g., when the conditions defined for the line or rung collectively satisfy a true condition). At 1104, a determination is made as to whether optimization processing is given priority. The optimization processing can be given priority, for example, if the controller is not currently executing a control or safety task that is defined as high priority. If the optimization processing is not given priority (NO at step 1104), subsequent steps of the optimization processing are deferred until priority is granted. When optimization processing is given priority (YES at step 1104), the methodology proceeds to step 1106, where a determination is made as to whether a set of initial values have been obtained for a set of control variables to be optimized by the optimization processing. If the initial values have not yet been obtained (NO at step 1106), the methodology proceeds to step 1108, where initial values of the set of control variables are determined using a suitable method. The initial values can be obtained based on the cost function and one or more associated constraints that define the optimization problem to be solved, such that the initial values are feasible solutions to the optimization problem.

The methodology then returns to step 1104, and another determination is made as to whether the optimization processing is given priority. In this regard, the controller may exit the optimization processing (maintaining the current state of the optimization routine) if the controller begins executing a high priority task, then re-enter the optimization processing upon completion of the high priority task. If the optimization processing is no longer granted priority (NO at step 1104), subsequent optimization processing is deferred until priority is again granted. If the optimization processing is granted priority (YES at step 1104), the methodology proceeds again to 1106 and determines that the initial values have already been obtained (YES at step 1106), and consequently proceeds to step 1110, where a determination is made as to whether an additional iteration of the optimization processing is to be performed.

In general, repeated iterations of the optimization processing can update the values of the set of control variables subject to the objective function and the one or more constraints to converge on a set of values that substantially minimize the objective function subject to the constraints. In some embodiments, the controller can perform either a specified fixed number of iterations of the optimization algorithm, or can continue to perform iterations until a set of values are obtained that satisfy a defined minimization criterion that ends the iterative optimization process.

If an additional iteration is to be performed (YES at step 1110), the methodology proceeds to step 1112, where another iteration of the optimization algorithm is performed based on the cost function and the one or more constraints defined by the optimization instruction to yield updated values of the set of control variables. The methodology then returns to step 1104, and steps 1104-1112 repeat as needed until no further iterations are required (e.g., the number of iterations has reached a defined limit, or the minimization criterion has been satisfied). If no more iterations are to be performed (NO at step 1110), the methodology proceeds to step 1114, where the values of the optimized control variables are output for consumption by the control program (e.g., for use by the control program in connection with performing a control task).

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 12:
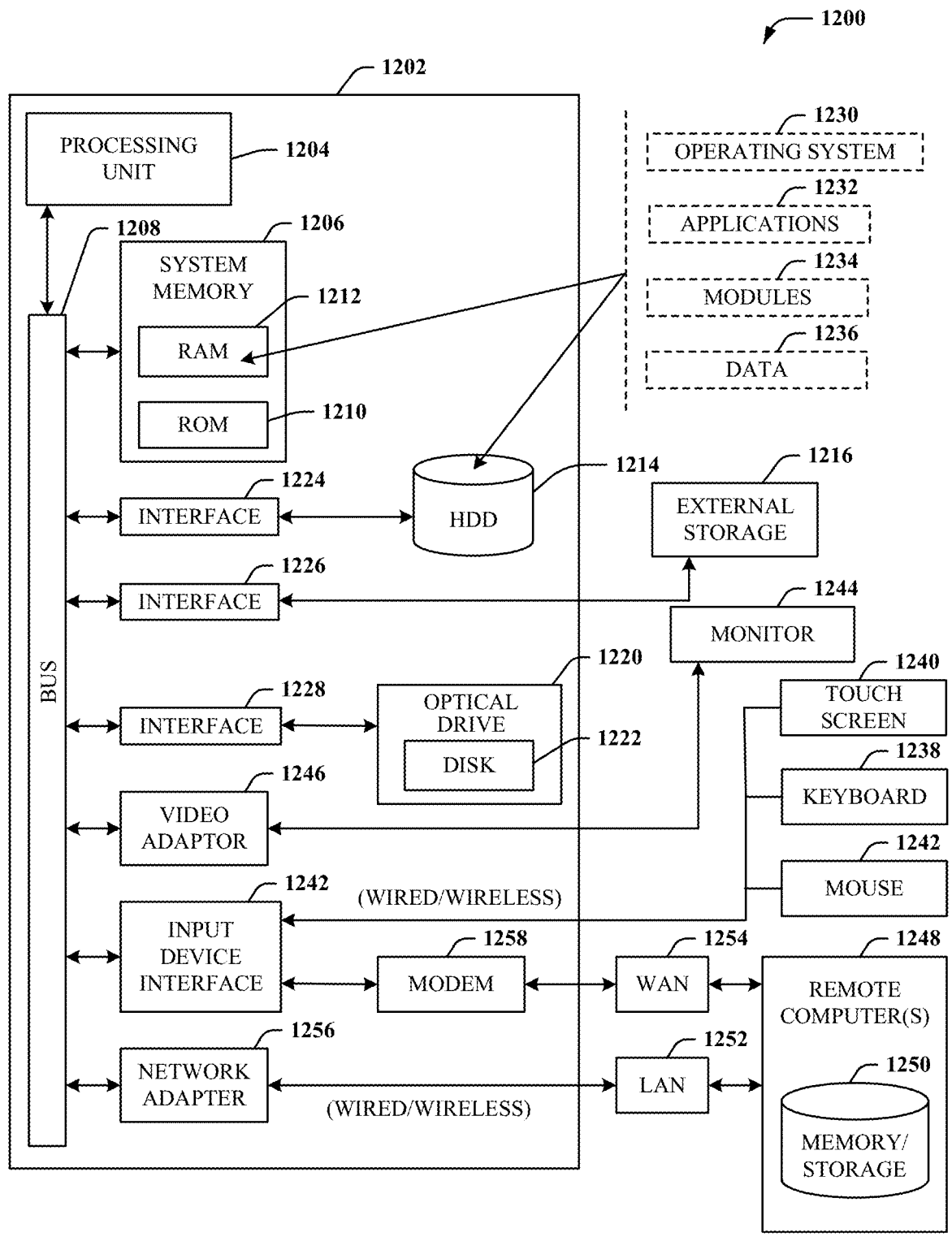
FIG. 12 is an example computing environment.
Figure 13:
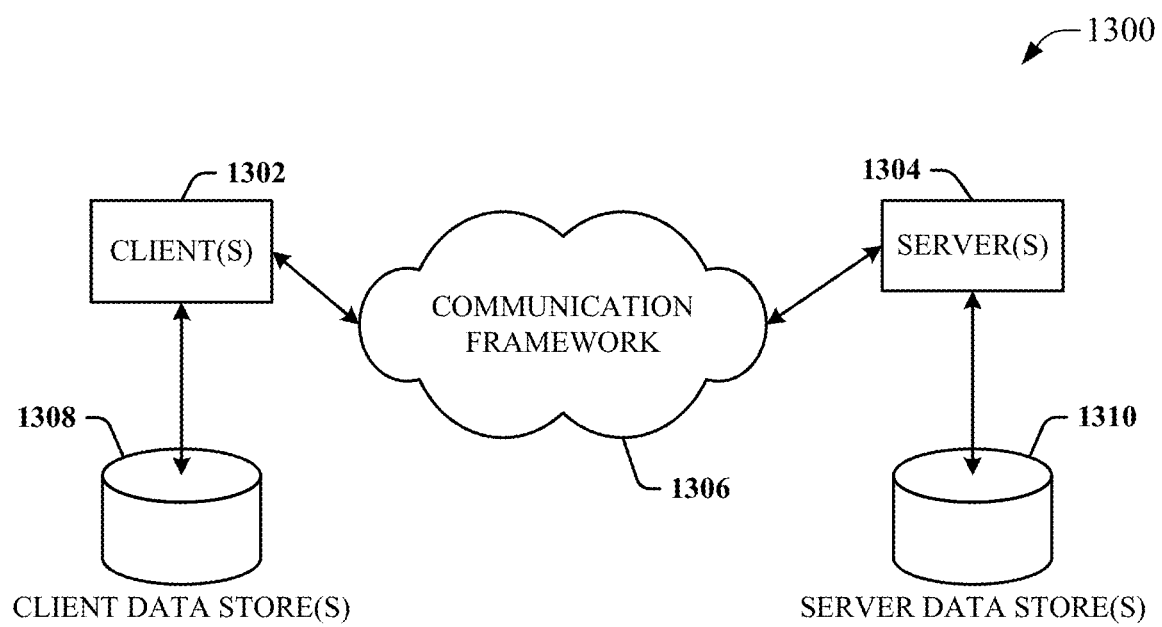
FIG. 13 is an example networking environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12 the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for application programs 1232. Runtime environments are consistent execution environments that allow application programs 1232 to run on any operating system that includes the runtime environment. Similarly, operating system 1230 can support containers, and application programs 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1224. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless access point (AP) disposed thereon for communicating with the adapter 1256 in a wireless mode.

When used in a WAN networking environment, the computer 1202 can include a modem 1258 or can be connected to a communications server on the WAN 1254 via other means for establishing communications over the WAN 1254, such as by way of the Internet. The modem 1258, which can be internal or external and a wired or wireless device, can be connected to the system bus 1208 via the input device interface 1224. In a networked environment, program modules depicted relative to the computer 1202 or portions thereof, can be stored in the remote memory/storage device 1250. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1252 or WAN 1254 e.g., by the adapter 1256 or modem 1258, respectively. Upon connecting the computer 1202 to an associated cloud storage system, the external storage interface 1226 can, with the aid of the adapter 1256 and/or modem 1258, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 13 is a schematic block diagram of a sample computing environment 1300 with which the disclosed subject matter can interact. The sample computing environment 1300 includes one or more client(s) 1302. The client(s) 1302 can be hardware and/or software (e.g., threads, processes, computing devices). The sample computing environment 1300 also includes one or more server(s) 1304. The server(s) 1304 can also be hardware and/or software (e.g., threads, processes, computing devices). The servers 1304 can house threads to perform transformations by employing one or more embodiments as described herein, for example. One possible communication between a client 1302 and servers 1304 can be in the form of a data packet adapted to be transmitted between two or more computer processes. The sample computing environment 1300 includes a communication framework 1306 that can be employed to facilitate communications between the client(s) 1302 and the server(s) 1304. The client(s) 1302 are operably connected to one or more client data store(s) 1308 that can be employed to store information local to the client(s) 1302. Similarly, the server (s) 1304 are operably connected to one or more server data store(s) 1310 that can be employed to store information local to the servers 1304.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An industrial controller, comprising:
a memory; and
a processor, operatively coupled to the memory that executes executable components stored on the memory, wherein the executable components comprise:
a program execution component configured to execute an industrial control program using scan-based processing, wherein the industrial control program processes input signals from industrial input devices of an automation system and controls output signals to industrial output devices of the automation system based on the input signals; and
an optimization component configured to execute a mathematical optimization routine using the scan-based processing,
wherein
the mathematical optimization routine calculates, over a series of iterations across multiple scan cycles of the industrial control program, a set of values for respective control variables that minimize an objective function subject to one or more constraints,
the optimization component performs, during respective different scan cycles of the multiple scan cycles, an initialization step of the mathematical optimization routine and multiple iteration steps of the mathematical optimization routine, and
for each scan cycle of the respective different scan cycles, the optimization component
defers execution of a current step, of the initialization step or one of the multiple iteration steps, in response to determining that the industrial controller is executing a task defined as having a high priority, and
permits execution of the current step in response to determining that the industrial controller is not performing the task defined as having the high priority.

2. The industrial controller of claim 1, wherein the control variables, the objective function, and the one or more constraints are defined as instruction parameters of an optimization instruction included in the industrial control program.

3. The industrial controller of claim 2, wherein the industrial control program is a ladder logic program, and the optimization instruction is an instruction added to the ladder logic program as a rung output.

4. The industrial controller of claim 3, wherein at least one of the control variables, the objective function, or the one or more constraints are configurable via interaction with the instruction using a control program development platform.

5. The industrial controller of claim 1, wherein the objective function is a quadratic function.

6. The industrial controller of claim 1, wherein the mathematical optimization routine is written in a same programming language as the industrial control program.

7. The industrial controller of claim 1, wherein the control variables comprise at least one of setpoints for a manufacturing process being monitored and controlled by the industrial controller or amounts of respective materials to be blended by the automation system.

8. The industrial controller of claim 1, wherein the task defined as having the high priority is at least one of a safety operation, a current operating mode of the automation system having the high priority, or a current phase of a control process being performed by the automation system and having the high priority.

9. The industrial controller of claim 1, wherein
the respective control variables are percentages of respective materials to be used in a batch sequence, and
the one or more constraints are at least one of a constraint on a percentage of one of the materials of the respective materials, a size composition, or a percent vertical.

10. A method, comprising:
executing, by an industrial controller comprising a processor, an industrial control program using scan-based processing, wherein the executing comprises monitoring input signals from industrial input devices of an automation system and controlling output signals to industrial output devices of the automation system based on the input signals; and
executing, by the industrial controller, an optimization algorithm using the scan-based processing, wherein the executing of the optimization algorithm comprises
performing, during respective different scan cycles performed by the industrial controller on the industrial control program, an initialization step of the optimization algorithm and multiple iteration steps of the optimization algorithm,
determining, based on execution of the multiple iteration steps, a set of values for respective control variables that minimize an objective function subject to one or more constraints, and
for each scan cycle of the respective different scan cycles,
deferring execution of a current step, of the initialization step or one of the multiple iteration steps, in response to determining that the industrial controller is executing a task defined as having a high priority, and
permitting execution of the current step in response to determining that the industrial controller is not performing the task defined as having the high priority.

11. The method of claim 10, wherein the control variables, the objective function, and the one or more constraints are defined as instruction parameters of an optimization instruction included in the industrial control program.

12. The method of claim 11, wherein
the executing of the industrial control program comprises executing a ladder logic program, and
the optimization instruction is an instruction added to the ladder logic program as a rung output.

13. The method of claim 12, wherein at least one of the control variables, the objective function, or the one or more constraints are configurable via interaction with the instruction using a control program development platform.

14. The method of claim 10, wherein the objective function is a quadratic function.

15. The method of claim 10, wherein the optimization algorithm is written in a same programming language as the industrial control program.

16. The method of claim 10, wherein the determining of the set of values comprises determining at least one of setpoints for a manufacturing process being monitored and controlled by the industrial controller or determining amounts of respective materials to be blended by the automation system.

17. The method of claim 10, wherein the task defined as having the high priority is at least one of a safety operation, a current operating mode of the automation system having the high priority, or a current phase of a control process being performed by the automation system and having the high priority.

18. A non-transitory computer-readable medium having stored thereon instructions that, in response to execution, cause an industrial controller comprising a processor to perform operations, the operations comprising:
executing an industrial control program using scan-based processing supported by the industrial controller, wherein the executing comprises monitoring input signals from industrial input devices of an automation system and controlling output signals to industrial output devices of the automation system based on the input signals; and
executing an optimization routine using the scan-based processing, wherein the executing of the optimization routine comprises
performing, in respective different scan cycles of the industrial control program, an initialization step of the optimization routine and multiple iteration steps of the optimization routine,
determining, based on results of the multiple iteration steps, a set of values for respective control variables that minimize an objective function subject to one or more constraints, and
for each scan cycle of the respective different scan cycles,
deferring execution of a current step, of the initialization step or one of the multiple iteration steps, in response to determining that the industrial controller is executing a task defined as having a high priority, and
permitting execution of the current step in response to determining that the industrial controller is not performing the task defined as having the high priority.

19. The non-transitory computer-readable medium of claim 18, wherein the control variables, the objective function, and the one or more constraints are defined as instruction parameters of an optimization instruction included in the industrial control program.

20. The non-transitory computer-readable medium of claim 19, wherein
the executing of the industrial control program comprises executing a ladder logic program, and
the optimization instruction is an instruction added to the ladder logic program as a rung output.

* * * * *